United States Patent [19]
Fukute

[11] Patent Number: 4,784,499
[45] Date of Patent: Nov. 15, 1988

[54] BEARING UNIT

[75] Inventor: Osamu Fukute, Inuyama, Japan

[73] Assignee: Daido Metal Company Ltd., Nagoya, Japan

[21] Appl. No.: 926,513

[22] Filed: Nov. 3, 1986

[30] Foreign Application Priority Data

Mar. 13, 1986 [JP] Japan .................................. 61-55944

[51] Int. Cl.⁴ ............................................. F16C 17/02
[52] U.S. Cl. .................... 384/295; 384/439; 384/441; 384/905.1
[58] Field of Search ............... 384/540, 258, 279, 300, 384/295, 276, 439, 441, 905.1

[56] References Cited

U.S. PATENT DOCUMENTS

| 989,569 | 4/1911 | Cook | 384/540 |
|---|---|---|---|
| 3,193,335 | 7/1965 | Wing | 384/300 |
| 4,325,593 | 4/1982 | Mallet | 384/905.1 |
| 4,545,691 | 10/1985 | Kastan et al. | 384/540 |
| 4,576,488 | 3/1986 | Steiner et al. | 384/286 |

FOREIGN PATENT DOCUMENTS

| 90905 | 6/1982 | Japan . |
|---|---|---|
| 619 | 1/1983 | Japan . |
| 58-529 | 4/1984 | Japan . |
| 576391 | 4/1946 | United Kingdom . |
| 620046 | 3/1949 | United Kingdom . |
| 1091673 | 6/1964 | United Kingdom . |
| 1553479 | 9/1979 | United Kingdom . |

Primary Examiner—Lenard A. Footland
Attorney, Agent, or Firm—Browdy and Neimark

[57] ABSTRACT

A bearing unit of this invention includes, instead of a conventionally used bracket, a housing formed with an external thread and a bush press fitted in an inner bore of the housing.

19 Claims, 4 Drawing Sheets

BEARING UNIT

BACKGROUND OF THE INVENTION

1. Field of the Invention

The present invention relates to a bearing unit for use in industrial machines, such as automobiles, marine vessels, various types of electrical machines, business machines, agricultural machines, machine tools, foodstuff machines, textile machinery, and packaging machines. More particularly, the present invention concerns a bearing unit provided with screws which make the unit detachable to an industrial machine.

2. Description of the Prior Art

Hitherto, an expensive bracket having a complicated structure has been used for mounting a bearing in an industrial machine. Such a bracket is formed integral with a housing having an inner bore of high precision for receiving a plain bearing bush.

It is difficult to accurately machine the inner bore of the aforementioned housing with a bracket within a short time, and machining is extremely difficult particularly in cases where a plurality of plain bearing bushes are aligned in and press fitted in the inner bore of the housing.

SUMMARY OF THE INVENTION

According to the present invention, there is provided a bearing unit including a housing with an external thread and a bush adapted to be press fitted in the inner bore of the housing. This housing is screwed or inserted into a hole with or without an internally threaded bore of an industrial machine to which the bearing unit is to be applied, and is then secured by means of a nut or nuts.

DESCRIPTION OF THE PREFERRED EMBODIMENTS

Figure 1:
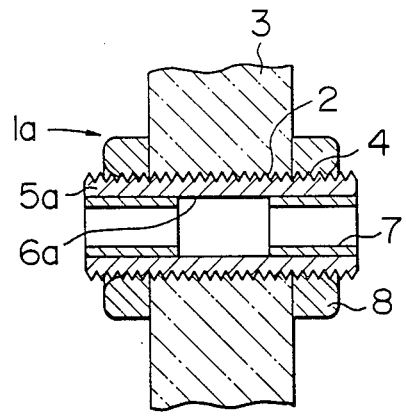
FIGS. 1 to 10 are cross-sectional views of a bearing unit in the longitudinal direction thereof in accordance with a first to tenth embodiment of the present invention.

Referring to FIG. 1, there is shown a bearing unit $1a$ of a double-nut tightened type in accordance with a first embodiment of the present invention. This bearing unit includes a housing $5a$ provided with external threads, two bushes 7 adapted to be press fitted into an inner bore $6a$ of the housing, and two nuts 8 screwed onto the external threads of the housing. The housing $5a$ is formed of chromium molybdenum steel (SCM435) or the like, and the bushes 7 are in the form of, for instance, a DU Dry Bearing, a DX Dry Bearing, or a DIVEST bushing with a backing metal. In this embodiment, two bushes 7 are used, but one or three bushes may be used. The two nuts 8 interpose therebetween a portion 3 of an industrial machine upon assembling of a bearing unit, and washers and/or spring washers may be placed between the nuts 8 and the portion 3. In case an internal thread 2 is formed in the portion 3 of the industrial machine, the housing $5a$ may be screwed directly into that portion, and the nuts 8 may be omitted. In addition, if a rust preventive is required, the overall bearing unit may be plated. The DU Dry Bearing is a registered trademark of Gracia Metal Ltd., a British company, and is a high performance PTFE bearing made by sintering porous bronze on a backing metal (steel or bronze) and impregnating and coating the same with a mixture of PTFE and Pb. The DIVEST bush is a registered trademark of Daido Metal Co., Ltd. This bush is manufactured by impregnating and coating pores and surfaces of a porous metallic layer provided on the surface of a backing metal with a composition which includes as its major component a synthetic resin such as polyacetal, resin and as additives a lipophilic fibrous material and a lubricant oil agent as well as metallic soap and/or a solid lubricant, as required, and by sintering the same. The DX Bearing is also a registered trademark of Gracia Metal Ltd., a British company, and is a polyacetal prelubricated bearing produced by adding an abrasion-resistant agent to polyacetal resin, instead of PTFE and Pb of the aforementioned DU Dry Bearing.

Figure 2:
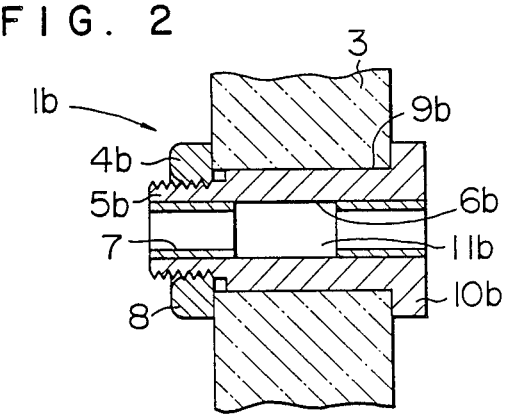

Referring to FIG. 2, there is shown a bearing unit $1b$ of a single-flanged single-nut tightened type. This bearing unit differs from the bearing unit $1a$ of the first embodiment in the shape of a housing $5b$ thereof and in the use of only one nut 8. In other words, the housing $5b$ includes a cylindrical outer peripheral surface $9b$ formed concentrically with an inner bore $6b$ with high precision, a flange $10b$ formed at one end portion thereof, and an external thread $4b$ formed at the other end portion thereof. A space $11b$ formed between the two bushes 7 disposed about both ends of the inner bore $6b$ may be used as a grease reservoir or an oil reservoir. In this case, two rotary shafts may be inserted from both ends of the bearing unit, respectively.

Figure 3:
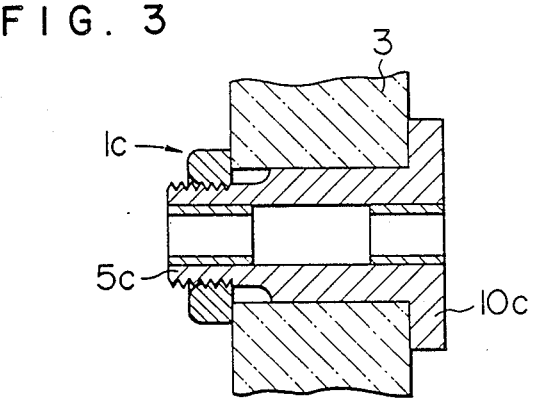

Referring to FIG. 3, there is shown a bearing unit $1c$ of a single-flanged and stepped and single-nut tightened type in accordance with a third embodiment of the present invention. This bearing unit differs from that of the second embodiment in that the outside diameter of a housing $5c$ thereof and that of a flange $10c$ are greater than those of the latter.

Figure 4:
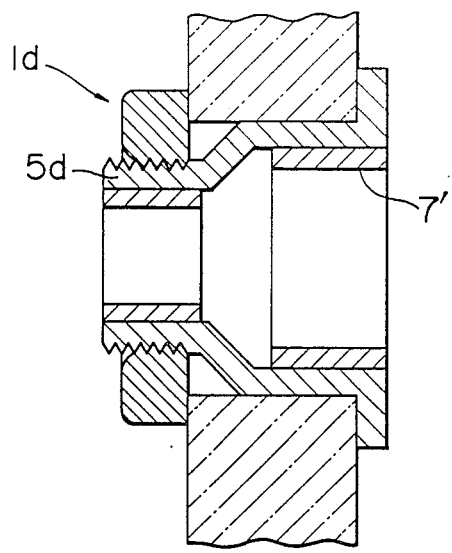

Referring to FIG. 4, there is shown a bearing unit $1d$ of the single-flanged and stepped and single-nut tightened type in accordance with a fourth embodiment of the present invention. This bearing unit differs from those of the second and third embodiments in that the inner bore of a housing $5c$ thereof is enlarged and a D bush $7'$ is press fitted in this inner bore.

Figure 5:
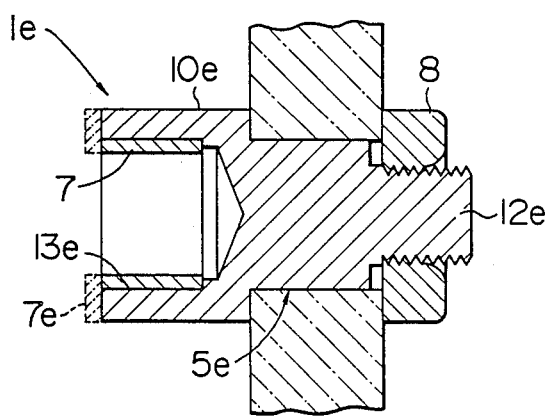

Referring to FIG. 5, there is shown a bearing unit $1e$ of the single-flanged and stepped and single-nut tightened type in accordance with a fifth embodiment of the present invention. This bearing unit includes a nut 8, a housing $5e$ and a bush 7. The housing $5e$ includes a bolt $12e$ provided with an external thread, a cylindrical portion adapted to be mounted in the portion 3 of the industrial machine and a flange $10e$. An inner bore $13e$ in the form of a blind bore is formed in the flange $10e$, and the end portion of this inner bore may be used as a grease or oil reservoir. Alternatively, a thrust washer or a thrust bearing may be fitted into the inner end portion of the blind bore to bear a thrust load in the axial direction. The bush 7 is press fitted in the inner bore $13e$. The nut 8 may be omitted by forming an internal thread in the bore of the portion 3 of the industrial machine. In addition, a flanged bush $7e$ may be used instead of the bush 7, as shown by a chain line in FIG. 5. Furthermore, alternatively, in addition to the bush $7e$ shown in the Figure, a thrust washer may be secured to the end surface of the flange $10e$ by screws or an adhesive so as to bear a radial load and a thrust load.

Figure 6:
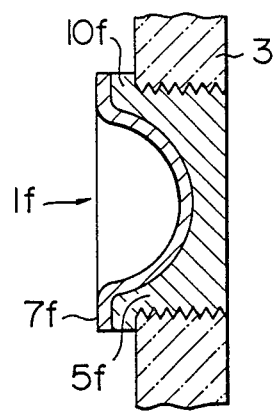

Referring to FIG. 6, there is shown a bearing unit $1f$ of a type provided with a semi-spherical cup seat in accordance with a sixth embodiment of the present invention. This bearing unit includes a plastic housing 5f and a semi-spherical cup-type bearing member 7f formed of a slide bearing material. The housing 5f has a generally cylindrical shape, and is formed at its outer peripheral surface with an external thread. The one end of the housing 5f is formed with a substantially semi-spherical recess and a flange 10f which recess receives the cup-type bearing member 7f. In assembly, the external thread of the housing is screwed into the portion 3 of the industrial machine, and the flange 10f is adapted to abut against the portion 3.

Figure 7:
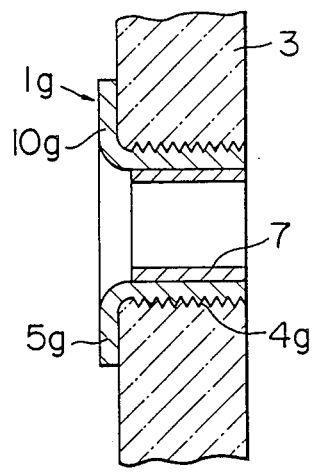

Referring to FIG. 7, there is shown a bearing unit 1g of a drawn-flange type. This bearing unit includes a housing 5g formed of a deep drawn steel plate and a single-flanged bush 7 such as a wrapped bush bearing. The housing has an external thread 4g formed on the outer peripheral surface thereof and a flange 10g formed at one end portion thereof. The housing may be made of a synthetic resin instead of the deep drawn steel plate, and when the threaded portion 4g is sufficiently screwed in that portion upon mounting to the portion 3 of the industrial machine, the housing abuts against the end surface of that portion. As shown in FIGS. 5 and 7, when a single-flanged bush or double-flanged bush (not shown) is used, a rotary shaft is formed with a step and the step is made to abut against the flange of the bush.

Figure 8:
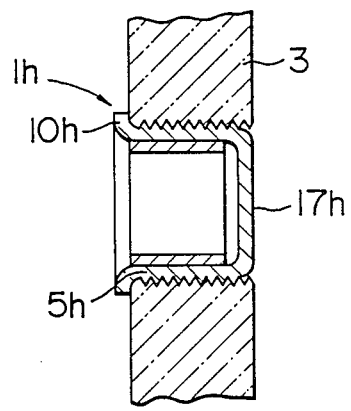

Referring to FIG. 8, there is shown a bearing unit 1h of a drawn flange and bottomed type in accordance with an eighth embodiment of the present invention. This bearing unit is similar to the bearing unit of the seventh embodiment except that the outside diameter of a flange 10h thereof is small and the end portion of the housing 5h is made blind as at 17h. The bearing unit shown in FIG. 8 is useful in terms of the safety of the end portion of a rotary shaft, enclosing of grease and prevention of entrance of dust. The housing 5h may be formed of a synthetic resin instead of a deep drawn steel plate. The bearing unit 1h shown in FIG. 8 may be made to bear a thrust load by placing a thrust washer or a thrust bearing in the blind end portion as in the case of the bearing unit 1e shown in FIG. 5. Alternatively, a thrust load in the axial direction may be born by placing a thrust washer or a thrust bearing at the innermost portion of the blind bore.

Figure 9:
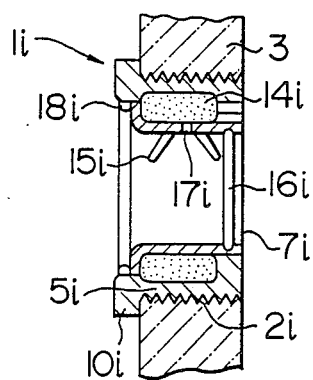

Referring to FIG. 9, there is shown a bearing unit 1i in accordance with a ninth embodiment of the present invention. This bearing unit includes a housing 5i formed with a flange 10i and an external thread 2i, a single-flanged bush 7i and a lipophilic fibrous member 14i. The single-flanged bush 7i is formed at its inner peripheral surface with an oil groove 15i, an oil thrower groove 16i and an oil window 17i. The flange 10i of the housing is provided about the inner peripheral portion thereof with an oil seal 18i.

Figure 10:
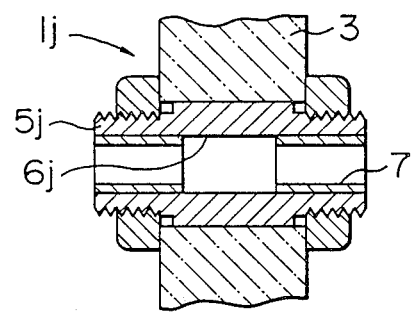

Referring to FIG. 10, there is shown a bearing unit 1j of a double-nut tightened type in accordance with a tenth embodiment of the present invention. This bearing unit is similar to the bearing unit 1a shown in FIG. 1 except that a housing 5j thereof is formed at the central portion thereof with a cylindrical surface. In assembly, the cylindrical portion in the center of the housing 5j fits in the cylindrical inner bore of the portion 3 of the industrial machine. A thrust washer or a thrust bearing (not shown) may be arranged in the space formed between both the bushes 7 press fitted in the inner bore 6j of the housing 5j to bear a thrust load. The same is the case with the bearing units shown in FIGS. 1 to 4.

Thrust load applied by two rotating shafts can be born by inserting from the opposite end of the housing 5j shown in FIG. 10 bearing bushes described in Japanese Patent Application No. 145855/1984 (Japanese Patent Laid-Open Publication No. 24815/1986) and having a bore and an inward directed flange. Furthermore, cup-shaped bearing bushes without a bore may be press fitted from both sides of the housing. When either of these bearing bushes described above is replaced by the bearing bushes shown in FIGS. 1 to 5 and FIG. 8, it becomes possible to bear both a radial load and a thrust load simultaneously.

According to the present invention, a housing having a bush press fit therein has an external thread along the overall or partial length of the outer peripheral portion thereof, whereby it becomes possible for the housing to be mounted in a threaded bore or inner bore of a portion of an associated industrial machine. In addition, two bearing bushes can be incorporated into a housing, so that alignment thereof can be facilitated, and partial abrasion of the bearing resulting from one-sided contact of a rotary shaft can be prevented.

In addition, the bearing unit of the present invention is fit for various uses because adjustment of movement in the axial direction can be made by the provision of a thread in the housing. Moreover, bearing units provided with a thread in accordance with the present invention can be manufactured at low cost in comparison with a conventional arrangement having a bracket integral formed with a housing.

What is claimed is:

1. A structure including a bearing unit installed within a wall of an industrial machine comprising
   a wall of an industrial machine having a generally planar portion of a first thickness and having a hole therethrough of predetermined circumference;
   an elongated housing having a length, extending into said hole, at least as great as said first thickness of said generally planar portion of said wall of the industrial machine, and extending through said generally planar portion of said first thickness of said wall while in contact with a substantially major portion of said circumference of said hole in said wall;
   said elongated housing having an inner bore, and an external thread extending along at least a portion of the length of said elongated housing;
   holding means to hold said housing and said wall stationary relative to each other;
   said holding means including
   said external thread,
   receiving means to receive said external thread,
   opposing means to oppose the force of said external thread being received in said receiving means;
   and at least one bushing press fitted within said inner bore of said elongated housing.

2. The structure according to claim 1 wherein
   said external thread extends beyond both sides of said first thickness of said wall;
   said receiving means is an internal thread on said predetermined circumference of said hole, and further includes a first nut screwed onto an end of said housing;
   said opposing means is a second nut screwed onto said external threads on an opposite end of said of said housing from said first nut.

3. The structure according to claim 1 wherein said housing has a cylindrical outer peripheral surface no greater than the depth of said hole in said wall and with a circumference of said cylindrical outer peripheral surface of said housing tight-fitting in said predetermined circumference of said hole;

said opposing means is a flanged portion on said housing on an opposite end of said housing from said receiving means.

4. The structure according to claim 3 wherein
said receiving means is a nut screwed onto said external threads of said housing.

5. The structure according to claim 3 wherein
said cylindrical outer peripheral surface of said housing is shorter than said depth of said hole in said wall.

6. The structure according to claim 3 wherein
said cylindrical outer peripheral surface of said housing and said predetermined circumference of said hole are both smooth allowing press-fitting of said housing into said predetermined circumference of said hole.

7. The structure according to claim 1 wherein
said housing has a cylindrical outer peripheral surface no greater than the depth of said hole in said wall and with a circumference of said cylindrical outer peripheral surface of said housing tight-fitting in said predetermined circumference of said hole;

said external thread extending on said housing from both sides of said first thickness of said wall;

first and second nuts screwed on said external thread forming said receiving and opposing means.

8. The structure according to claim 1 wherein
said external thread of said housing extends substantially the depth of said hole;

said receiving means comprises an internal thread on said predetermined circumference of said hole substantially equal in length to said external thread of said housing;

said opposing means is a flange on an end of said housing and integral with said housing.

9. The structure according to claim 8 wherein
the thickness of said housing and its said flange are substantially the same throughout.

10. The structure according to claim 8 wherein
said at least one bushing extends along said inner bore substantially the distance of said first thickness of said hole in said wall.

11. The structure according to claim 1 wherein
said housing has a cylindrical outer peripheral surface no greater than the depth of said hole in said wall and with a smooth circumference of said cylindrical outer peripheral surface of said housing tight-fitting in a smooth said predetermined circumference of said hole;

said opposing means is a flanged portion on said housing on an opposite end of said housing from said receiving means;

said receiving means is a nut screwed onto said external threads of said housing.

said cylindrical outer peripheral surface of said housing is shorter than said depth of said hole in said wall;

the outer diameter of said housing having said external threads is less that the diameter of said cylindrical outer peripheral surface of said housing.

12. The structure according to claim 11 wherein
said internal bore of said housing is a bore of larger internal diameter in a portion of said housing having said cylindrical outer peripheral surface external to said housing and a bore of smaller internal diameter in said internal bore in a portion of said housing having said external threads;

said at least one bushing is a bushing press-fitted into said internal bore of said bore of larger internal diameter and a second bushing press-fitted into said internal bore of said bore of smaller internal diameter.

13. The structure according to claim 1 wherein peripheral surface no greater than the depth of said hole in said wall and with a circumference of said first cylindrical outer peripheral surface of said housing tight-fitting in said predetermined circumference of said hole;

said opposing means is a flanged portion on said housing on an opposite end of said housing from said receiving means having a second cylindrical outer peripheral surface of greater diameter than said first cylindrical outer peripheral surface;

said receiving means is a nut screwed onto said external threads of said housing;

said internal bore is located substantially in said flange.

14. The structure according to claim 1 wherein
said external thread of said housing extends substantially the depth of said hole;

said receiving means comprises an internal thread on said predetermined circumference of said hole substantially equal in length to said external thread of said housing;

said opposing means is a flange on an end of said housing and integral with said housing;

an opposite end of said housing from said flange is an enclosed blind end of said housing.

15. The structure according to claim 14 wherein
an outer wall of said enclosed blind end of said housing is substantially in the same plane with a surface of said wall.

16. The structure according to claim 15 wherein
a semi-spherical cup seat is received in said inner bore of said housing.

17. The structure according to claim 1 wherein
said external thread of said housing extends substantially the depth of said hole;

said receiving means comprises an internal thread on said predetermined circumference of said hole substantially equal in length to said external thread of said housing;

said opposing means is a flange on an end of said housing and integral with said housing;

said at least one bushing is a single flanged bushing having a lipophilic fibrous member between said bushing and said housing.

18. The structure according to claim 17 wherein
said bushing includes an oil groove, an oil thrower groove and at least one oil window at a peripheral surface of said bushing.

19. The structure according to claim 18 wherein
an oil seal is located about an inner peripheral portion of said flange.

* * * * *